(12) United States Patent
Peuker et al.

(10) Patent No.: US 7,971,693 B2
(45) Date of Patent: Jul. 5, 2011

(54) DAMPER

(75) Inventors: Thomas Peuker, Ammerthal (DE); Andreas Pelczer, Wassertudingen (DE)

(73) Assignee: Suspa Holding GmbH, Altdorf (DE)

( * ) Notice: Subject to any disclaimer, the term of this patent is extended or adjusted under 35 U.S.C. 154(b) by 689 days.

(21) Appl. No.: 11/504,060

(22) Filed: Aug. 15, 2006

(65) Prior Publication Data

US 2007/0039792 A1 Feb. 22, 2007

(30) Foreign Application Priority Data

Aug. 16, 2005 (DE) .................. 10 2005 038 953

(51) Int. Cl.
*F16F 11/00* (2006.01)
*F16F 9/26* (2006.01)

(52) U.S. Cl. ................. 188/381; 267/196; 267/201

(58) Field of Classification Search ............ 188/322.16, 188/322.17, 322.18, 129, 381; 267/196, 267/201
See application file for complete search history.

(56) References Cited

U.S. PATENT DOCUMENTS

| | | | |
|---|---|---|---|
| 3,332,523 A | | 7/1967 | Chambers |
| 4,191,313 A | * | 3/1980 | Blake et al. .................. 222/335 |
| 5,295,564 A | * | 3/1994 | Stadelmann ................ 188/381 |
| 5,788,030 A | * | 8/1998 | Rottenberger ............. 188/290 |
| 5,961,105 A | * | 10/1999 | Ehrnsberger et al. ......... 267/216 |
| 6,264,014 B1 | * | 7/2001 | Ferlicca ....................... 188/129 |
| 6,443,270 B1 | * | 9/2002 | Hodge .................... 188/196 BA |
| 6,955,248 B2 | * | 10/2005 | Park et al. ...................... 188/267 |
| 7,341,132 B2 | * | 3/2008 | Peuker et al. ................ 188/381 |
| 7,445,098 B2 | * | 11/2008 | Peuker et al. ................ 188/381 |
| 2002/0043809 A1 | * | 4/2002 | Vismara ....................... 293/133 |
| 2003/0136358 A1 | * | 7/2003 | Galvin ........................ 123/48 B |

FOREIGN PATENT DOCUMENTS

| | | |
|---|---|---|
| DE | 32 16 152 A1 | 12/1982 |
| DE | 3216152 A1 | 12/1982 |
| DE | 37 25 100 A1 | 2/1989 |
| DE | 196 15 010 A1 | 10/1997 |
| DE | 100 46 712 A1 | 4/2001 |
| DE | 10 2004 033 531 A1 | 2/2005 |
| DE | 10 2005 005 177 A1 | 9/2005 |
| EP | 0301190 A | 2/1989 |
| EP | 1 220 961 B1 | 2/2004 |
| EP | 1455011 A | 9/2004 |
| EP | 1637640 A | 3/2006 |
| JP | 63176836 A * | 7/1988 |
| WO | WO 98/26194 | 6/1998 |

* cited by examiner

*Primary Examiner* — Melody M Burch
(74) *Attorney, Agent, or Firm* — Browdy and Neimark, P.L.L.C.

(57) ABSTRACT

In a damper, in particular for spin-drying washing machines, it is provided, with a view to improved solidity and noise behaviour of the damper, that at least one buffer stop is disposed between at least one piston and at least one stop element, the buffer stop comprising at least one flexibly pliable buffer stop element which is integral with the at least one piston or the at least one stop element.

25 Claims, 8 Drawing Sheets

DAMPER

BACKGROUND OF THE INVENTION

1. Field of the Invention

The invention relates to a damper, in particular for spin-drying washing machines.

2. Background Art

Dampers of the generic type are used for vibration damping in rotary cylinder washing machines, ensuring calm and vibrationless operation of the rotary cylinder washing machine. Known dampers exhibit a damping behaviour that depends on the vibration amplitude, given varying speeds of the rotary cylinder. In the range of small amplitudes, insignificant damping by the dampers is desirable, whereas as high as possible a damping effect is desirable with great amplitudes. This amplitude-dependent damping behaviour results in a constructionally complicated design of the dampers.

SUMMARY OF THE INVENTION

It is an object of the invention to embody as simple as possible a damper which is solid, causing little noise and having an amplitude-dependent damping behaviour.

This object is attained in a damper, comprising a casing which has a central longitudinal axis; a tappet which is displaceable in the casing in a direction of the central longitudinal axis and is extended out of the casing; fastening elements which are mounted on free ends of the casing and the tappet; and a frictional damping unit which is disposed inside the casing, producing damping action, comprising at least one piston which is displaceable in relation to the casing and the tappet in the direction of the central longitudinal axis; at least one frictional lining which is partially enclosed by the at least one piston; at least one stop element for limitation of the motion of the at least one piston in the direction of the central longitudinal axis by strike against the at least one stop element; at least one buffer stop which is disposed between the at least one piston and the at least one stop element, damping the stop of the piston, the at least one buffer stop having at least one flexibly pliable buffer stop element which is integral with the at least one piston or the at least one stop element. The gist of the invention resides in that, for damping the strike of the at least one piston against the stop element, a buffer stop mechanism provided between the at least one piston and the at least one stop element, the at least one buffer stop comprising at least one flexibly pliable buffer-stop element which is integral with the at least one piston or with the at least one stop element. In case of great vibration amplitudes, the motion of the at least one piston is defined by it stopping on the at least one stop element, the at least one piston making a motion relative to the casing and/or the tappet, and the at least one frictional lining rubbing for a damping effect to be produced. The at least one buffer stop damps the stop of the at least one piston on the at least one stop element, so that the damper is solid and quiet. With the at least one buffer stop element of the at least one buffer stop being flexibly pliable and integral with the at least one piston or with the at least one stop element, the damper is of simple design and can be produced at a low cost.

Further features, details and advantages of the invention will become apparent from the ensuing description of several exemplary embodiments, taken in conjunction with the attached drawing.

DESCRIPTION OF PREFERRED EMBODIMENTS

Figure 1:
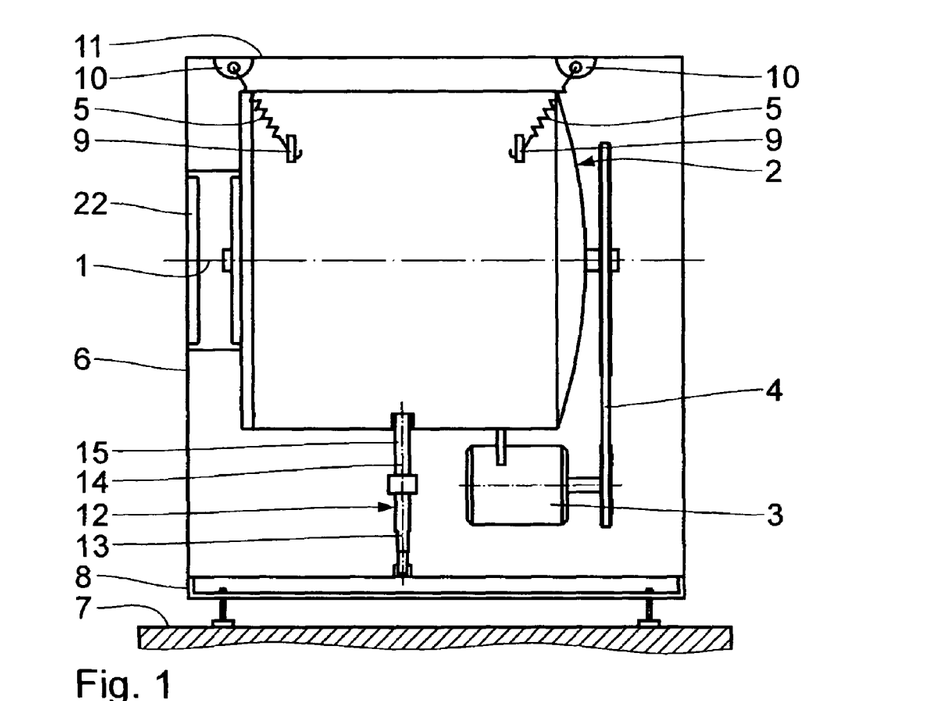
FIG. 1 is a diagrammatic side view of a rotary-cylinder washing machine with a damper according to a first embodiment.
Figure 2:
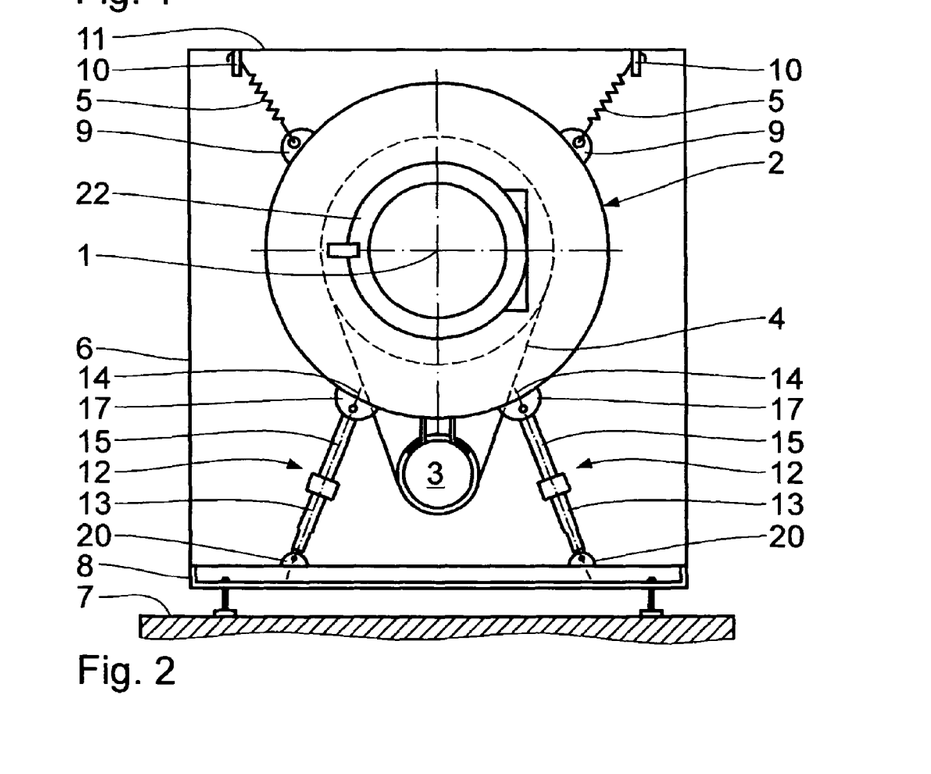
FIG. 2 is an elevation of the rotary-cylinder washing machine according to FIG. 1.

The following is a description of a first embodiment of the invention, taken in conjunction with FIGS. 1 to 6. A rotary-cylinder washing machine, which is illustrated in FIGS. 1 and 2 and has a horizontal or inclined cylinder axis 1, comprises a vibratory washer unit 2 with a driving motor 3 that drives a washing cylinder (not shown in detail) via a belt drive 4. Further components, which are joined to the washer unit 2, such as a transmission, are not illustrated for clarity. The vibratory washer unit 2 is suspended, by means of helical extension springs 5, from a washing-machine housing 6 which supports itself on, and is connected to, a machine frame 8 that stands on the floor 7 and constitutes a main frame. The helical extension springs 5 are mounted on first eyes 9 which are disposed in the top area of the washer unit 2. On the other hand they are suspended from second eyes 10 which are formed on the washing machine housing 6. The housing 6 is covered by a cover plate 11.

The bottom side of the washer unit 2 is centrically provided with two frictional dampers 12 which are connected to the machine frame 8; they are going to be described in detail below. Each frictional damper 12 comprises a tubular casing 13 with a central longitudinal axis 14, a tappet 15 being coaxially displaceably guided therein. At its free end the tappet 15 comprises a first fastening element 16, by means of which the frictional damper 12 is mounted on a first bearing 17 on the washer unit 2 in such a way that the frictional damper 12 is able to pivot in relation to the washer unit 2 about a first pivoting axis 18 that is parallel to the cylinder axis 1. A second fastening element 19 is attached to the free end of the casing 13, the frictional damper 12 thereby being mounted on a second bearing 20 on the machine frame 8 in such a way that the frictional damper 12 is able to pivot in relation to the machine frame 8 about a second pivoting axis 21 that is parallel to the cylinder axis 1. Loading and removing laundry takes place through a flap 22 that is disposed on the washer unit 2.

In the following, the structure of the frictional damper 12 is going to be described in detail, taken in conjunction with FIGS. 3 to 6. The tubular casing 13 of the frictional damper 12 comprises a guide section 23 and a receptacle section 24, the two of them being one piece. The guide section 23 is disposed downstream of the receptacle section 24 in a direction of insertion 25. The free end of the guide section 23, which is simultaneously the free end of the casing 13, is closed by means of a bottom 26. The bottom 26 and the fastening element 19 are one piece. The guide section 23 has an inside diameter selected such that the tappet 15 is guided inside the casing 13 in the direction of insertion 25 with as little play as possible and is displaceable in a manner free from static friction.

Figure 3:
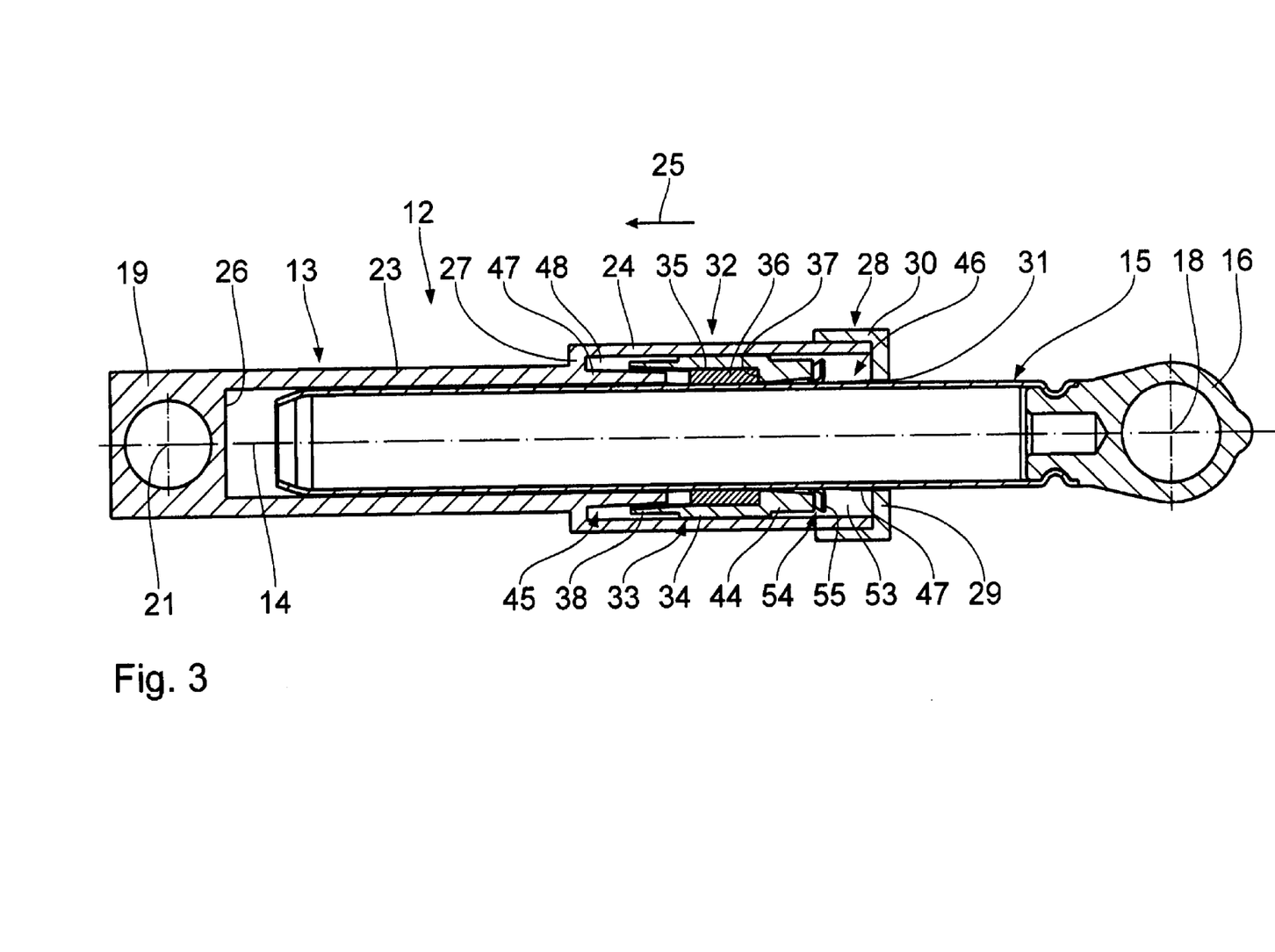
FIG. 3 is an axial sectional view of the damper according to FIG. 1.

The receptacle section 24 is disposed upstream of the guide section 23 in the direction of insertion 25. The receptacle section 24 has an inside diameter that is greater than the inside diameter of the guide section 23. The receptacle section 24 is fixed to the end, on the side of the tappet, of the guide section 23 by means of an annular stop collar 27.

Figure 6:
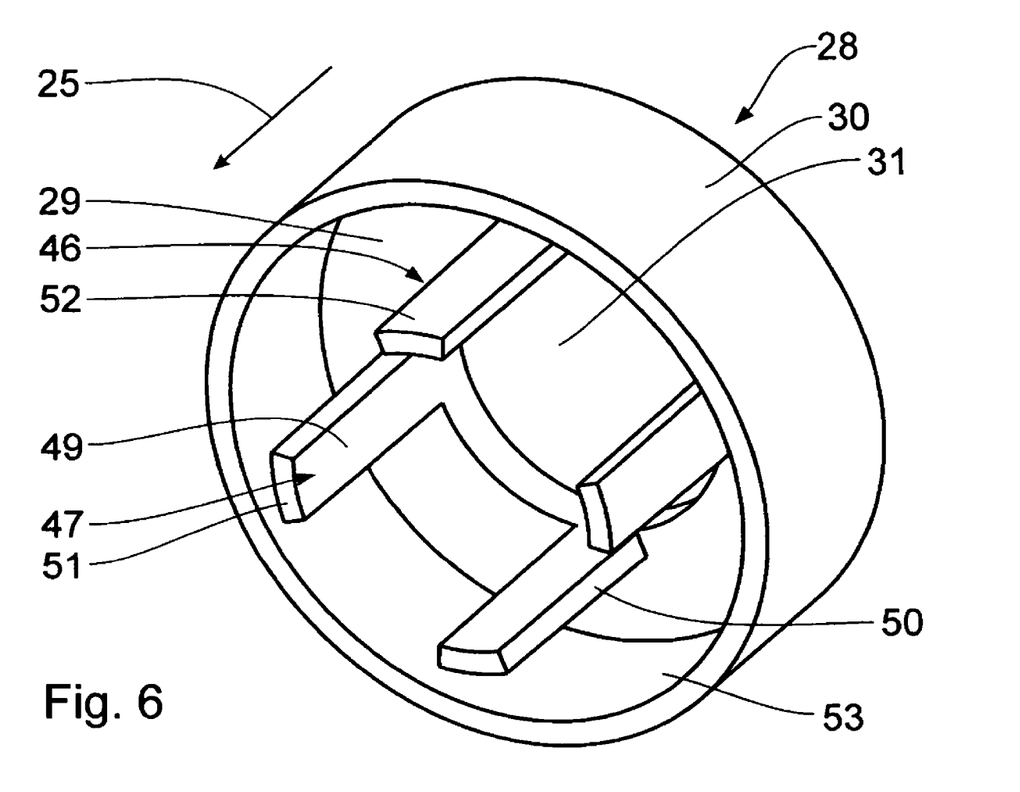
FIG. 6 is a perspective view of a cap of the damper according to FIG. 1.

The end of the receptacle section 24 that faces away from the guide section 23 is closed by a cap 28. The cap 28 has an annular cap collar 29 and a tubular fastening section 30 that is fixed thereto, the fastening section 30 extending along a central longitudinal axis 14 and enclasping the receptacle section 24. The end of the receptacle section 24 that faces away from the guide section 23 bears against the cap collar 29, and the cap 28 is secured against displacement by a locking mechanism (not shown) in the vicinity of the fastening section 30. The annular cap collar 29 forms a hole 31 which the tappet 15 is guided in, having as little play as possible.

Figure 4:
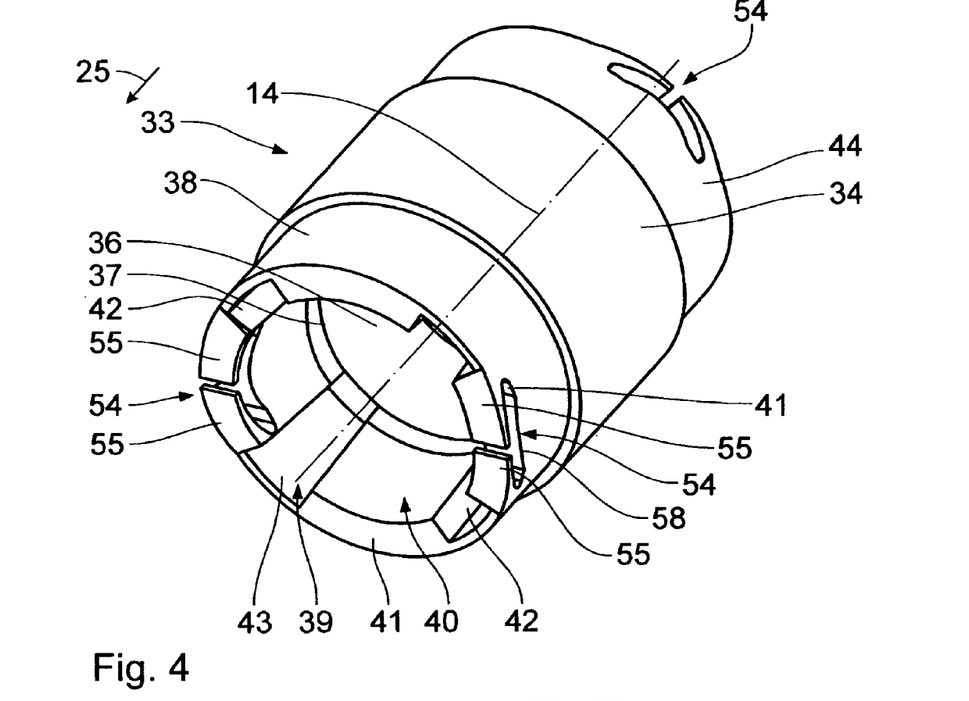
FIG. 4 is a perspective view of a piston of the damper according to FIG. 1.
Figure 5:
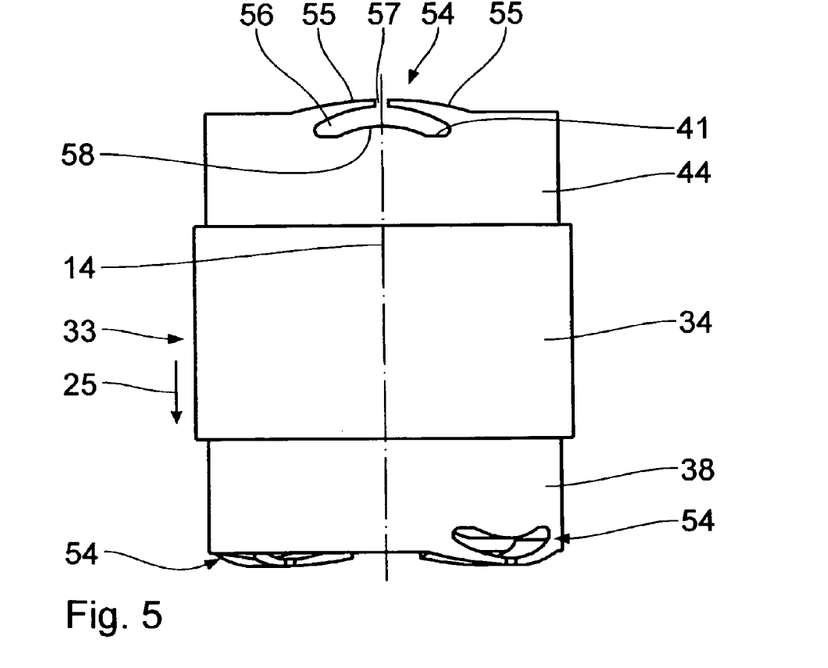
FIG. 5 is a plan view of the piston according to FIG. 4.

A frictional damping unit 32 is disposed inside the casing 13 in the vicinity of the receptacle section 24. The frictional damping unit 32 comprises a piston 33 which is displaceable in relation to the casing 13 and the tappet 15 along the central longitudinal axis 14. The piston 33 is substantially tubular, comprising a centric contact-pressure section 34 where an encircling annular groove 35 is disposed which is turned towards the tappet 15. Disposed in the annular groove 35 is an annularly encircling flexible frictional lining 36 which bears against side walls 37 of the annular groove 35 so that the groove 35 is partially enclosed by the piston 33 and secured against displacement relative thereto. Upon relative motion between the tappet 15 and the piston 33, the frictional lining 36 rubs against the tappet 15.

A first stop section 38 proceeds from the side wall 37 that is turned towards the casing 13; the stop section 38 and the contact-pressure section 34 form one piece. The first stop section 38 is tubular and does not bear against the receptacle section 24 of the casing 13. Along its inner circumference, the stop section 38 possesses several longitudinal grooves 39 which run in the direction of the central longitudinal axis 14 and taper in the direction of the frictional lining 36 and which extend as far as to the frictional lining 36. Consequently, the frictional lining 36 is free in the axial direction in the vicinity of the groves 39. Two grooves 39 at a time face each other diametrically. Located between two side by side grooves 39 is a wedge 40 which tapers in the opposite direction of the grooves 39, running in the way of a ramp in the direction of the side wall 37 and being integral therewith. Each wedge 40 has a front wall 41 and side walls 42 which respectively define a bottom 43 of a neighbouring groove 39. Each bottom 43 extends in the direction of the frictional lining 36 equally in the way of a ramp.

Corresponding to the first stop section 38, a second stop section 44 proceeds from the side wall 37 that is turned towards the tappet 15. The second stop section 44 is structured in accordance with the first stop section 38 and integral with the contact-pressure section 34. The grooves 39 and wedges 40 of the second stop section 44 are rotated in relation to the first stop section 38, meaning that a wedge 40 of the first stop section 38 is opposite a groove 39 of the second stop section 43 and vice versa. For simplicity of assembly of the frictional lining 36, the piston 33 may have a multi-piece configuration.

For defined motion of the piston 33 with the frictional lining 36 and for accomplishment of damping operation, the frictional damping unit 32 comprises a first stop element 45 on the side of the casing 13 and a second stop element 46 on the side of the tappet 15. Defining the motion of the piston 33 takes place by the frictional lining 36, or by the frictional lining 36 and the piston 33, stopping on one of the stop elements 45, 46. The first stop element 45 comprises the stop collar 27 and several stop pins 47 which proceed from the stop collar 27 in the direction of the central longitudinal axis 14. The stop pins 47 and the stop collar 27 and the guide section 23 of the casing 13 constitute one piece. The stop pins 47 are disposed and configured so as to form a prolongation of the guide section 23 so that the tappet 15 is additionally guided by the stop pins 47 of the first stop element 45. The stop pins 47 are further configured and disposed in such a way that the piston 33 can enclasp the stop pins 47 by the grooves 39 of the first stop section 38 so that the piston 33 is movable into a first annular space 48 between the receptacle section 24 and the stop pins 47. A detailed description of the stop pins 47 and of the array thereof is going to follow in conjunction with the description of the second stop element 46.

The second stop element 46 comprises the cap collar 29 and several stop pins 47 which are integral with the cap collar 29 and extend along the central longitudinal axis 14. The stop pins 47 are disposed in a circle around the central longitudinal axis 14, constituting a flush prolongation of the cap hole 31 so that the tappet 15 is additionally guided by the stop pins 47. To this end, the stop pins 47 are embodied as circular segments, a guide wall 49 that is turned towards the tappet 15 arching in accordance with the periphery of the tappet 15. Each stop pin 47 tapers, proceeding from the cap collar 29 in the direction of the frictional lining 36, and possesses two side walls 50 and a front wall 51. Furthermore, each stop pin 47, on the side turned away from the tappet 15, comprises an outside wall 52 which extends in the shape of a ramp in the direction of the cap collar 29. Two stop pins 47 at a time are disposed opposite each other diametrically, these two stop pins 47 having a uniform length along the central longitudinal axis 14, however a deviating length as compared to the remaining stop pins 47. A different arrangement is conceivable just as well. The stop pins 47 of the second stop element 46 cooperate with the receptacle section 24 of the casing 13 to form a second annular space 53, in which can move the second stop section 44 of the piston 33.

The detailed design of the first stop element 45 corresponds to that of the second stop element 46, the stop pins 47 of the second stop element 46 being staggered as compared to those of the first stop element 45 so that they may engage with the staggered grooves 39 of the second stop section 44. Preferably, the stop elements 45, 46 comprise four stop pins 47 each. Such a number of stop pins 47 will optimize the constructional implementation.

The piston 33 and the stop elements 45, 46 are configured in such a way that at least one of the stop pins 47 is disposed at least sectionally in one of the grooves 39. Such a configuration of the piston 33 and of the stop elements 45, 46 ensures that either at least one stop pin 47 of the first stop element 45 or at least one stop pin 47 of the second stop element 46 engages with one of the grooves 39 of the piston 33, thus putting into practice a safeguard against rotation of the piston 33 in relation to the stop elements 45, 46.

Fundamentally, the stop pins 47 may have any design, in particular any length and shape, as long as position and shape of the stop pins 47 correspond to the according grooves 39 so that the stop pins 47 are able to cooperate with the frictional lining 36. Pins of varying length are preferred for continuous, progressively increasing damping to be ensured.

For accomplishment of a damping effect on the piston 33 stopping on the stop collar 27 or the cap collar 29 in case of extreme vibration amplitudes, buffer stops 54 are provided between the piston 33 and the stop elements 45, 46. The stop sections 38, 44 of the piston 33 each comprise two buffer stops 54 which are formed on the front walls 41 of two opposed wedges 40. The buffer stops 54 of the first stop section 38 are staggered by the central longitudinal axis 14 in relation to the buffer stops 54 of the second stop section 44.

The buffer stops 54 are identical so that only one buffer stop 54 will be described below. The buffer stop 54 comprises two flexibly pliable buffer stop elements 55 which are integral with the wedge 40 of the piston 33, having the shape of bent tongues that proceed from the wedge side walls 42 towards each other. In the direction of the central longitudinal axis 14, the buffer stop elements 55 stand out from the front walls 41 of the neighbouring wedges 40, tapering as seen from the side walls 42 in the direction of the central longitudinal axis 14. The buffer stop elements 55 and the associated front wall 41 substantially define a buffer stop recess 56 which reaches sectionally into the piston 33 so that the front wall 41 that belongs to the buffer stop elements 55 stands back as compared to the front walls 41 of the neighbouring wedges 40. The buffer stop elements 55 can be bent into the buffer stop recess 56. An opening 57 is formed between the buffer stop elements 55 hat approach each other so that the buffer stop elements 55 are centrically spaced apart and do not touch. A buffer stop limit 58 is disposed opposite the buffer stop opening 57 in relation to the buffer stop recess 56; it arches in one piece with the wedge front wall 41 and the buffer stop elements 55. The buffer stop limit 58, for defined bending of the buffer stop elements 55, proceeds from the wedge front wall 41 along the central longitudinal axis 14 right into the buffer stop recess 56. By alternative, the buffer stop limit 58 can be dropped so that bending the buffer stop elements 55 is defined by the associated wedge front wall 41. Also, the buffer stop elements 55 can vary in design.

Alternatively, the buffer stop elements 55 and the stop elements 45, 46 can be one piece. In that case, the buffer stop limits 58 are simultaneously part of the stop elements 45, 46. For example, the buffer stop elements 55 can be disposed on the stop collar 27 and the cap collar 29.

Preferably the buffer stop elements 55 are made of plastic material.

The mode of operation of the frictional damper 12 during operation of the rotary-cylinder washing machine will be described in detail in the following. First the washer unit 2 is filled with laundry and the rotary cylinder is speeded up by the aid of the driving motor 3 and the belt drive 4. The damping behaviour of the frictional damper 12 in case of low vibration amplitudes is going to be described first. These low vibration amplitudes occur with so-called uncritical speeds, for example during a spinning job of the rotary-cylinder washing machine. In that case, the motion of the tappet 15 in relation to the casing 13 in the direction of the central longitudinal axis 14 is insignificant to such an extent that the piston 33, together with the frictional lining 36, does not touch the first and second stop element 45, 46. Owing to the static friction of the frictional lining 36, the piston 33 does not make any motion in relation to the tappet 15 so that the frictional lining 36 does not rub against the tappet 15. That condition is called idle stroke free from friction. In that condition, the frictional damper 12 exhibits insignificant damping behaviour that is characterized by the other friction losses during the motion of the tappet 15. The casing 13 and the tappet 15 are largely uncoupled in that condition.

If, as opposed to that, the speed of the rotary-cylinder washing machine is in a range of so-called critical speed or should there be some major imbalance, then great vibration amplitudes of the tappet 15 occur in relation to the casing 13. In that case, the piston 33, together with the frictional lining 36, and the stop elements 45, 46 start interacting, the piston 33 making a motion in relation to the tappet 15 so that the frictional lining 36 rubs against the tappet 15. If, proceeding from the position seen in FIG. 3, the tappet 15 is moved in the direction of insertion 25, then the piston 33 is first entrained in the direction of insertion 25, owing to the static friction between the frictional lining 36 and the tappet 15. As the depth of insertion grows, the first stop section 38 increasingly passes by the grooves 39 over the stop pins 47 of the first stop element 45. Once the stop pins 47, by their front wall 51, touch the frictional lining 36 that is free in the vicinity of the grooves 39, then the motion of the piston 33 is braked and a motion of the frictional lining 36 in relation to the tappet 15 occurs. The frictional lining 36 rubs against the tappet 15, producing damping behaviour. The damping behaviour is dependent on the rate of the relative motion and independent of the depth of immersion of the stop pins 47 into the frictional lining 36. Their varying length causes the stop pins 47 to immerse successively in the frictional lining 36 so that there is no abrupt retardation of the piston 33 and, consequently, no abrupt increase of load on the machine frame 8. With two opposed stop pins 47 at a time having a uniform length, the piston 33 and the tappet 15 are safely prevented from tilting. Due to the immersion of the stop pins 47, the flexible frictional lining 36 counteracts the motion of the piston 33, buffering the impact of the stop pins 47 on the frictional lining 36.

Upon return of motion of the tappet 15, the piston 33 is again first entrained counter to the direction of insertion 25 because of the stiction between the frictional lining 36 and the tappet 15 so that the piston 33 does not move in relation to the tappet 15. As the motion counter to the direction of insertion 25 grows, the second stop section 44, by the grooves 39, increasingly passes over the stop pins 47 of the second stop element 46. By immersion of the stop pins 47 in the frictional lining 36 the motion of the piston 33 is braked so that the frictional lining 36 makes a motion in relation to the tappet 15, rubbing against the tappet 15. The cooperation of the second stop element 46 with the frictional lining 36 corresponds to the behaviour of immersion, described above, of the first stop element 45. Upon renewed return of motion of the tappet 15, the piston 33 is again entrained in the direction of insertion 25, owing to the static friction between the frictional lining 36 and the tappet 15. The described motion cycle repeats.

If the vibration amplitude of the frictional damper 12 is such that the buffer effect of the frictional damping 36 is not sufficient for limiting the motion of the piston 33, the buffer stops 54 start acting. With extreme vibration amplitudes, the buffer stop elements 55 of the buffer stops 54 strike against the stop collar 27 of the first stop element 45 and against the cap collar 29 of the second stop element 46. As the motion of the piston 33 increases, for example in the direction of insertion 25, the flexible buffer stop elements 55 bend in the direction of the buffer stop limit 58, counteracting and damping the strike of the piston 33. With the motion of the piston 33 at a standstill, the flexible buffer stop elements 55 rebound, moving the piston 33 counter to the direction of insertion 25 until they are relaxed. In the case of extreme vibration amplitudes, any bending of the buffer stop elements 55 is defined by strike against the buffer stop limit 58 or, should there be no buffer stop limit 58, by strike against the associated wedge front wall 41. Simultaneously, the front walls 41 of the wedges 40 that adjoin the buffer stops 54 hit against the stop collar 27. Upon return of motion of the tappet 15, the piston 33 is entrained counter to the direction of insertion 25, the described process repeating when the piston 33 hits against the cap collar 29.

The buffer stops 54 prevent the piston 33 from striking abruptly against the stop elements 45, 46 so that the friction damper 12 works quietly even in case of extreme vibration amplitudes. With any deep immersion of the stop elements 45, 46 in the frictional lining 36 being reduced by means of the buffer stops 54, the lifetime of the frictional damper 12, particularly of the frictional lining 36, augments, which means high solidity of the frictional damper 12. The one-piece design of the buffer stop elements 55 and the piston 33 or, alternatively, the stop elements 45, 46 enables the frictional damper 12 to be manufactured easily and at a low cost.

Figure 7:
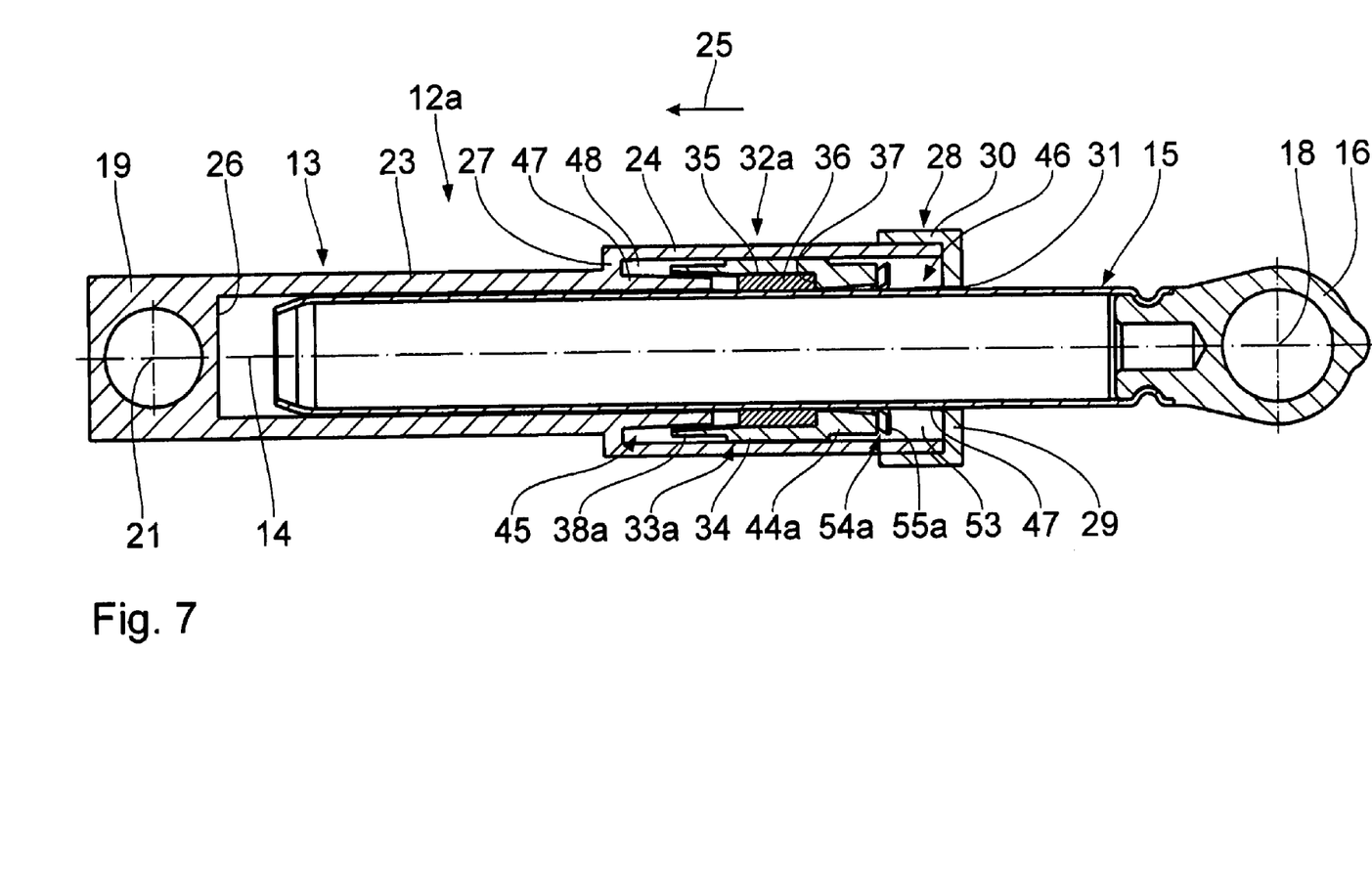
FIG. 7 is an axial sectional view of a damper according to a second embodiment.
Figure 8:
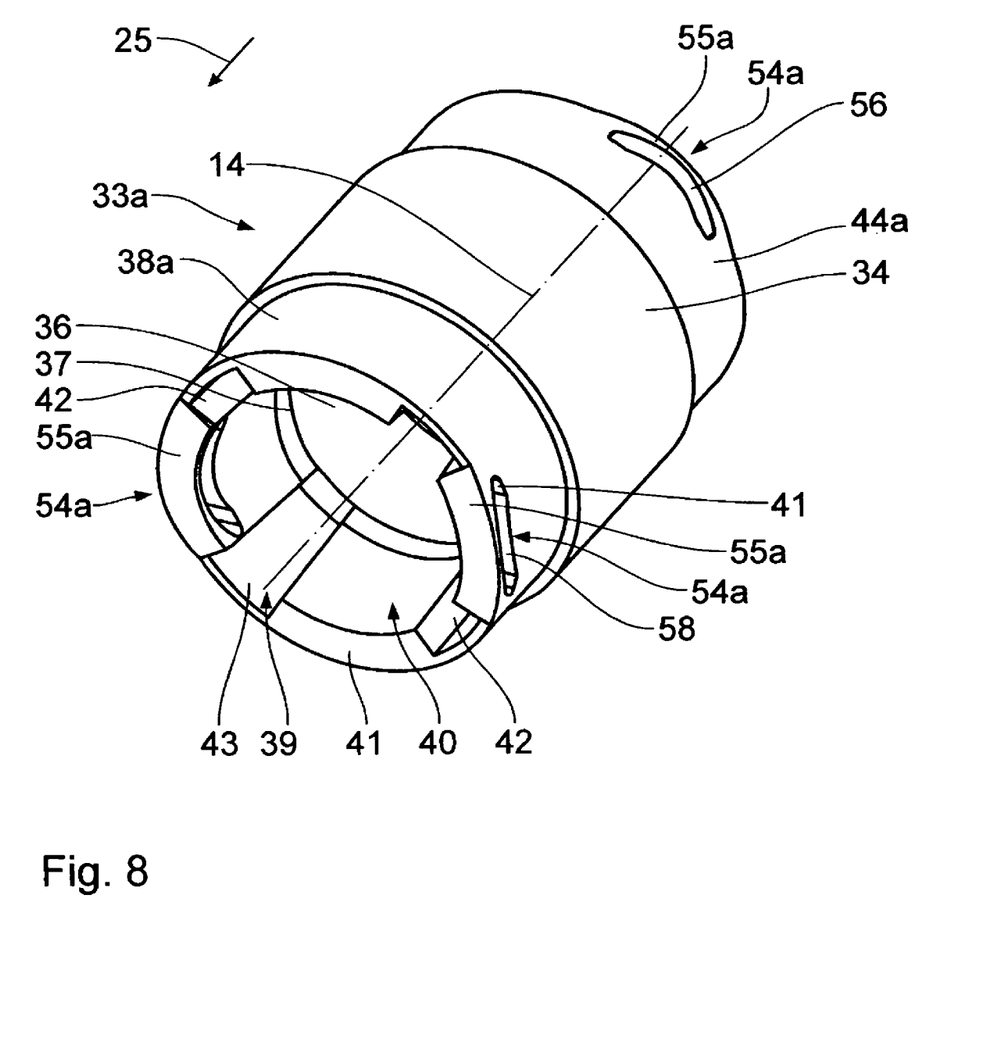
FIG. 8 is a perspective view of a piston of the damper according to FIG. 7.

In the following, a second embodiment of the invention will be described, taken in conjunction with FIGS. 7 and 8. Constructionally identical parts have the same reference numerals as in the first embodiment, to the description of which reference is made. Parts that differ constructionally, but are alike functionally, have the same reference numerals with an "a" suffixed. The essential difference from the first embodiment resides in that the buffer stops 54a have a continues buffer stop element 55a in the shape of an arc which narrows centrically and completely defines the buffer stop recess 56 on the side opposite the wedge front wall 41. A buffer stop opening is not provided. By alternative, the buffer stops 54a can just as well be disposed on the stop collar 27 of the first stop element 45 and the cap collar 29 of the second stop element 46. As regards the mode of operation of the frictional damper 12a, reference is made to the first embodiment.

Figure 9:
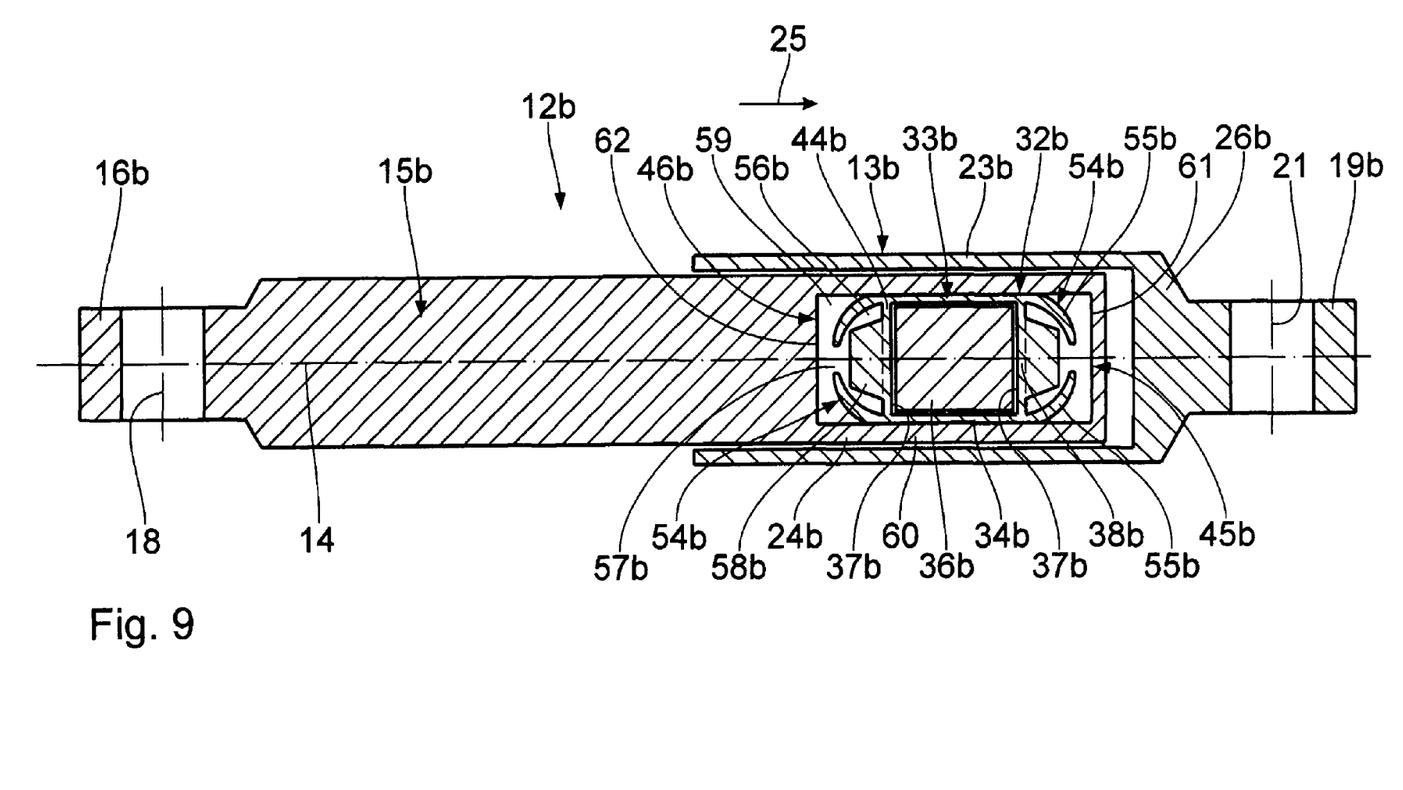
FIG. 9 is an axial sectional view of a damper according to a third embodiment.

In the following, a third embodiment of the invention will be described, taken in conjunction with FIG. 9. Constructionally identical parts have the same reference numerals as in the first embodiment, to the description of which reference is made. Parts that differ constructionally, but are alike functionally, have the same reference numerals with an "b" suffixed. The essential difference from the preceding embodiments resides in the configuration and arrangement of the piston 33b. The casing 13b and the tappet 15b of the friction damper 12b are rectangular cross-sectionally, the casing 13b only comprising the guide section 23b. The receptacle section 24b is formed on the end of the tappet 15b that is turned toward the casing 13b. For accommodation of the piston 33b, the tappet 15b comprises a recess 59 in the vicinity of the receptacle section 24b. The recess 59 comprises side walls 60 which run in the direction of the central longitudinal axis 14, and, crosswise of the central longitudinal axis 14, a first front wall 61 on the side of the casing 13b, and a second front wall 62 of corresponding extension on the side of the tappet 15b. The piston 33b is disposed in the recess 59, with the first front wall 61 constituting the first stop element 45b and the second front wall 62 the second stop element 46b.

The piston 33b is a rectangular frame, the equally rectangular frictional lining 36b being disposed inside the piston 33b. Towards the side walls 60 and the front walls 61, 62, the frictional lining 36b is enclosed by the piston 33b, while rubbing by its free sides against the casing 13b. Alternatively, several frictional linings 36b can be provided, which are disposed on a supporting structure. The stop sections 38b, 44b of the piston 33b are walls, there being no wedges and grooves for stop pins. The buffer stops 54b are disposed directly on the stop sections 38b, 44b. The buffer stop elements 55b are mounted integrally on the piston 33b, having the shape of a bent tongue. The buffer stop limits 58b, which are disposed inside the buffer stop recesses 56b, are also formed integrally on the piston 33b and substantially trapezoidal. Alternatively, the buffer stop limits 58b can be dropped entirely or configured as an at least partially flexible insert, in particular of PU foam. Further, the buffer stops 54b can also be configured to have a buffer stop element 54b in the form of a continuous arc, corresponding to the second embodiment.

With low vibration amplitudes of the frictional damper 12b, the motion of the piston 15b in relation to the casing 13b is insignificant to such an extent that the piston 33b does not touch the stop elements 45b, 46b. Owing to the static friction of the frictional lining 36b, the piston 33b does not make any motion relative to the casing 13b so that the frictional damper 12b possesses insignificant damping behaviour. In the case of important vibration amplitudes, interaction of the piston 33b and the stop elements 45b, 46b occurs, there being motion of the piston 33b in relation to the casing 13b so that the frictional lining 36b rubs against the casing 13b. For the stop of the piston 33b on the stop elements 45b, 46b to be damped, the buffer stop elements 55b flexibly bend into the buffer stop recesses 56b. The bending motion is abruptly stopped for the buffer stop limits 58b of integral configuration, whereas it is dampingly stopped for buffer stop limits 58b in the form of flexible inserts. The buffer stop limits 58b in the form of inserts are not much loaded because of the buffer stop elements 55b, thus having a long lifetime. As regards the further mode of operation, reference is made to the preceding embodiments.

Figure 10:
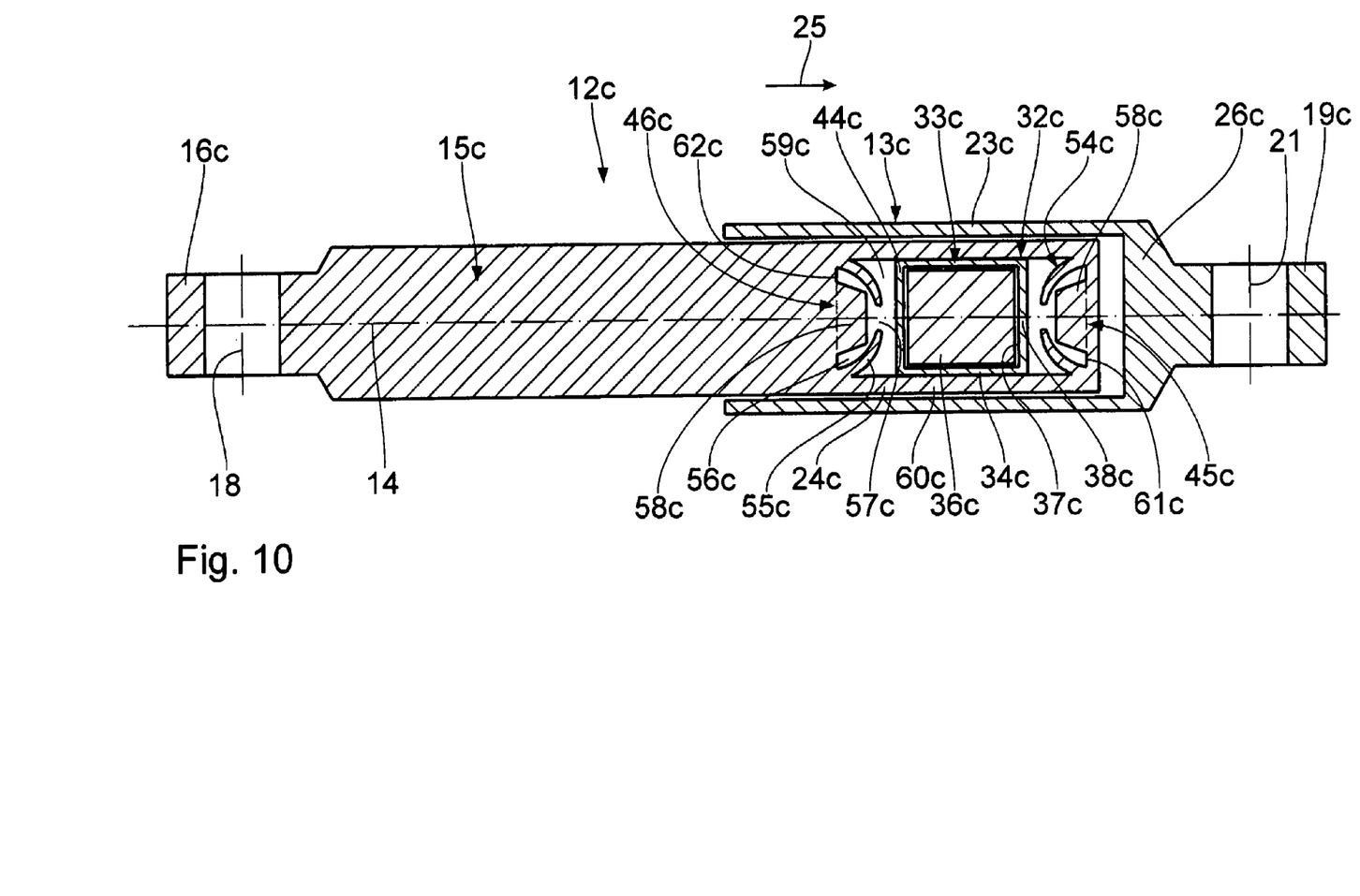
FIG. 10 is an axial sectional view of a damper according to a fourth embodiment.

In the following, a fourth embodiment of the invention will be described, taken in conjunction with FIG. 10. Constructionally identical parts have the same reference numerals as in the preceding embodiments, to the description of which reference is made. Parts that differ constructionally, but are alike functionally, have the same reference numerals with a "c" suffixed. The essential difference from the third embodiment resides in that the buffer stop elements 55c of the buffer stops 54c and the stop elements 45c, 46c of the frictional damper 12c form one piece. The buffer stop limits 58c are simultaneously part of the stop elements 45c, 46c. Alternatively, the buffer stop limits 58c can be partially flexible inserts, particularly of PU foam. Further, the buffer stop elements 55c can be configured as continuous arcs. As for the mode of operation, reference is made to the preceding embodiments.

What is claimed is:

1. A damper (12; 12a; 12b), comprising:
    a. a casing (13; 13b) which has a central longitudinal axis (14);
    b. a tappet (15; 15b) which is displaceable in the casing (13; 13b) in a direction of the central longitudinal axis (14) and is extended out of the casing (13; 13b);
    c. first and second fastening elements (16, 19; 16b, 19b), wherein the second fastening element (19; 19b) is mounted on a free end of the casing (13; 13b;) and wherein the first fastening element (16;) is mounted on a free end of the tappet (15; 15b); and
    d. a frictional damping unit (32; 32a; 32b) which is disposed inside the casing (13; 13b), producing damping action, comprising:
        i. at least one piston (33; 33a; 33b) which is displaceable in relation to the casing (13; 13b) and the tappet (15; 15b) in the direction of the central longitudinal axis (14), said at least one piston (33; 33a; 33b) comprising at least two neighboring wedges (40);
        ii. at least one frictional lining (36; 36b) which is partially enclosed by the at least one piston (33; 33a; 33b);

iii. at least one stop element (45, 46; 45b, 46b) for limitation of the motion of the at least one piston (33; 33a; 33b) in the direction of the central longitudinal axis (14) by striking against the at least one stop element (45, 46; 45b, 46b);

iv. at least one buffer stop (54; 54a; 54b) which is disposed between the at least one piston (33; 33a; 33b) and the at least one stop element (45, 46; 45b, 46b), damping the stop of the piston (33; 33a; 33b), the at least one buffer stop (54; 54a; 54b) having at least one flexibly pliable buffer stop element (55; 55a; 55b) which is in one piece with the at least one piston (33; 33a) and wherein the at least one flexibly pliable buffer stop element (55; 55a; 55b) is integral with one of said at least two wedges (40) of the piston (33; 33a; 33b) and wherein in a direction of the central longitudinal axis (14), the at least one flexibly pliable buffer stop element (55; 55a; 55b) stands out from a front wall (41) of said at least two neighboring wedges (40).

2. A damper according to claim 1, wherein the at least one buffer stop (54; 54a; 54b) comprises at least one buffer stop recess (56; 56b) which is partially defined by the at least one buffer stop element (55; 55a; 55b) and configured such that the at least one buffer stop element (55; 55a; 55b) is able to be bent into the at least one buffer stop recess (56; 56b).

3. A damper according to claim 1, wherein the at least one buffer stop element (55; 55a; 55b) is arched.

4. A damper according to claim 3, wherein the at least one buffer stop (54, 54b) comprises the at least one buffer stop element constituted by two tapering buffer stop elements (55; 55b) which run toward each other.

5. A damper according to claim 3, wherein a continuous buffer stop element (55a) which narrows centrically is provided, constituting the at least one buffer stop (54a).

6. A damper according to claim 2, wherein the at least one buffer stop (54, 54b) further comprises at least one buffer stop limit (58; 58b), and the at least one buffer stop limit (58; 58b) and the at least one buffer stop element (55; 55a; 55b) are one piece.

7. A damper (12; 12a; 12b), comprising:
a. a casing (13; 13b) which has a central longitudinal axis (14);
b. a tappet (15; 15b) which is displaceable in the casing (13; 13b) in a direction of the central longitudinal axis (14) and is extended out of the casing (13; 13b);
c. first and second fastening elements (16, 19; 16b, 19b), wherein the second fastening element (19; 19b) is mounted on a free end of the casing (13; 13b) and wherein the first fastening element (16; 16b) is mounted on a free end of the tappet (15; 15b); and
d. a frictional damping unit (32; 32a; 32b) which is disposed inside the casing (13; 13b), producing damping action, comprising:
i. at least one piston (33; 33a; 33b) which is displaceable in relation to the casing (13; 13b) and the tappet (15; 15b) in the direction of the central longitudinal axis (14), said at least one piston (33; 33a; 33b) comprising at least two neighboring wedges (40);
ii. at least one frictional lining (36; 36b) which is partially enclosed by the at least one piston (33; 33a; 33b);
iii. at least one stop element (45, 46; 45b, 46b) for limitation of the motion of the at least one piston (33; 33a; 33b) in the direction of the central longitudinal axis (14) by striking against the at least one stop element (45, 46; 45b, 46b);

iv. at least one buffer stop (54; 54a; 54b) which is disposed between the at least one piston (33; 33a; 33b) and the at least one stop element (45, 46; 45b, 46b), damping the stop of the at least one piston (33; 33a; 33b; 33c), the at least one buffer stop (54; 54a; 54b) having at least one flexibly pliable buffer stop element (55; 55a; 55b) which is in one piece with the at least one piston (33; 33a; 33b) and wherein the at least one flexibly pliable buffer stop element (55; 55a; 55b) is integral with one of said at least two wedges (40) of the piston (33; 33a; 33b) and wherein in a direction of the central longitudinal axis (14), the at least one flexibly pliable buffer stop element (55; 55a; 55b) stands out from a front wall (41) of said at least two neighboring wedges (40), e. wherein the at least one buffer stop element (55; 55a; 55b;) is made of plastic material.

8. A damper according to claim 7, wherein the at least one buffer stop (54; 54a; 54b) comprises at least one buffer stop recess (56; 56b which is partially defined by the at least one buffer stop element (55; 55a; 55b) and is configured such that the at least one buffer stop element (55; 55a; 55b) is able to be bent into the at least one buffer stop recess (56; 56b).

9. A damper according to claim 7, wherein the at least one buffer stop element (55; 55a; 55b) is arched.

10. A damper according to claim 9, wherein the at least one buffer stop (54, 54b) comprises the at least one buffer stop element constituted by two tapering buffer stop elements (55; 55b) which run toward each other.

11. A damper according to claim 9, wherein the at least one buffer stop (34a) comprises a continuous buffer stop element (55a) which narrows centrically.

12. A damper according to claim 8, wherein at least one buffer stop limit (58; 58b) is disposed in the at least one buffer stop recess (56; 56b), defining the bending of the at least one buffer stop element (55; 55a; 55b).

13. A damper according to claim 12, wherein the at least one buffer stop limit (58; 58b) and the at least one buffer stop element (55; 55a; 55b) are one piece.

14. A damper (12; 12a; 12b), comprising
a. a casing (13; 13b) which has a central longitudinal axis (14);
b. a tappet (15; 15b) which is displaceable in the casing (13; 13b) in a direction of the central longitudinal axis (14) and is extended out of the casing (13; 13b);
c. first and second fastening elements (16, 19; 16b, 19b), wherein the second fastening element (19; 19b) is mounted on a free end of the casing (13; 13b) and wherein the first fastening element (16; 16b) is mounted on a free end of the tappet (15; 15b); and
d. a frictional damping unit (32; 32a; 32b) which is disposed inside the casing (13; 13b), producing damping action, comprising
i. at least one piston (33; 33a; 33b) which is displaceable in relation to the casing (13; 13b) and the tappet (15; 15b) in the direction of the central longitudinal axis (14), said at least one piston (33; 33a; 33b) comprising at least two neighboring wedges (40);
ii. at least one frictional lining (36; 36b) which is partially enclosed by the at least one piston (33; 33a; 33b);
iii. at least one stop element (45, 46; 45b, 46b) for limitation of the motion of the at least one piston (33; 33a; 33b) in the direction of the central longitudinal axis (14) by striking against the at least one stop element (45, 46; 45b, 46b), the at least one stop element (45, 46; 45b, 46b) comprising four stop pins (47);
    iv. at least one buffer stop (54; 54a; 54b) which is disposed between the at least one piston (33; 33a; 33b) and the at least one stop element (45, 46; 45b, 46b), damping the stop of the at least one piston (33; 33a; 33b), the at least one buffer stop (54; 54a; 54b) having at least one flexibly pliable buffer stop element (55; 55a; 55b) which is in one piece with the at least one piston (33; 33a; 33b) and wherein the at least one flexibly pliable buffer stop element (55; 55a; 55b) is integral with one of said at least two wedges (40) of the piston (33; 33a; 33b) and wherein in a direction of the central longitudinal axis (14), the at least one flexibly pliable buffer stop element (55; 55a; 55b) stands out from a front wall (41) of said at least two neighboring wedges (40).

15. A damper according to claim 14, wherein the at least one buffer stop (54; 54a; 54b) comprises at least one buffer stop recess (56; 56b) which is partially defined by the at least one buffer stop element (55; 55a; 55b) and configured such that the at least one buffer stop element (55; 55a; 55b) is able to be bent into the at least one buffer stop recess (56; 56b).

16. A damper according to claim 14, wherein the at least one buffer stop element (55; 55a; 55b) is arched.

17. A damper according to claim 16, wherein the at least one buffer stop (54, 54b) comprises the at least one buffer stop element constituted by two tapering buffer stop elements (55; 55b) which run toward each other.

18. A damper according to claim 16, wherein the at least one buffer stop (54a) comprises a continuous buffer stop element (55a) which narrows centrically.

19. A damper according to claim 15, wherein at least one buffer stop limit (58; 58b) is disposed in the at least one buffer stop recess (56; 56b), defining the bending of the at least one buffer stop element (55; 55a; 55b).

20. A damper according to claim 19, wherein the at least one buffer stop limit (58; 58b) and the at least one buffer stop element (55; 55a; 55b) are one piece.

21. A damper (12b), comprising
    a. a casing (13b) which has a central longitudinal axis (14);
    b. a tappet (15b) which is displaceable in the casing (13b) in a direction of the central longitudinal axis (14) and is extended out of the casing (13b);
    c. first and second fastening elements (16b, 19b), wherein the second fastening element (19b) is mounted on a free end of the casing (13b) and wherein the first fastening element (16b) is mounted on a free end of the tappet (15b); and
    d. a frictional damping unit (32b) which is disposed inside the casing (13b), producing damping action, comprising
        i. at least one piston (33b) which is displaceable in relation to the casing (13b) and the tappet (15b) in the direction of the central longitudinal axis (14);
        ii. at least one frictional lining (36b) which is partially enclosed by the at least one piston (33b);
        iii. at least one stop element (45b, 46b) for limitation of the motion of the at least one piston (33b) in the direction of the central longitudinal axis (14) by striking against the at least one stop element (45b, 46b);
        iv. at least one buffer stop (54b) which is disposed between the at least one piston (33b) and the at least one stop element (45b, 46b) damping the stop of the at least one piston (33b), the at least one buffer stop (54b) having at least one flexibly pliable buffer stop element (55b) which is in one piece with the at least one piston (33b) and wherein the at least one flexibly pliable buffer stop element (55b) is integral in one piece with the piston (33b) and wherein in a direction of the central longitudinal axis (14), the at least one flexibly pliable buffer stop element (55b) extends longitudinally out from a front wall (38b, 44b) of the piston (33b), the at least one buffer stop (55b) further comprises at least one buffer stop recess (56b) which is partially defined by the at least one buffer stop element (55b) and configured such that the at least one buffer stop element (55b) is able to be bent into the at least one buffer stop recess (56b);
        v. at least one buffer stop limit (58b) which is disposed in the at least one buffer stop recess (56b), defining the bending of the at least one buffer stop element (55b).

22. A damper according to claim 21, wherein the at least one buffer stop element (55b) is arched.

23. A damper according to claim 22, wherein the at least one buffer stop (54b) comprises the at least one buffer stop element constituted by two tapering buffer stop elements (55b) which run toward each other.

24. A damper according to claim 21, wherein the at least one buffer stop limit (58b) and the at least one buffer stop element (55b) are one piece.

25. A damper (12c), comprising
    a. a casing (13c) which has a central longitudinal axis (14);
    b. a tappet (15c) which is displaceable in the casing (13c) in a direction of the central longitudinal axis (14) and is extended out of the casing (13c);
    c. first and second fastening elements (16c, 19c), wherein the second fastening element (19c) is mounted on a free end of the casing (13c) and wherein the first fastening element (16c) is mounted on a free end of the tappet (15c); and
    d. a frictional damping unit (32c) which is disposed inside the casing (13c), producing damping action, comprising
        i. at least one piston (33c) which is displaceable in relation to the casing (13c) and the tappet (15c) in the direction of the central longitudinal axis (14);
        ii. at least one frictional lining (36c) which is partially enclosed by the at least one piston (33c);
        iii. at least one stop element (45c, 46c) for limitation of the motion of the at least one piston (33c) in the direction of the central longitudinal axis (14) by striking against the at least one stop element (45c, 46c);
        iv. at least one buffer stop (54c) which is disposed between the at least one piston (33c) and the at least one stop element (45c, 46c), damping the stop of the at least one piston (33c), the at least one buffer stop (54c) having at least one flexibly pliable buffer stop element (55c), the at least one buffer stop (54c) further comprises at least one buffer stop recess (56c) which is partially defined by the at least one buffer stop element (55c) and configured such that the at least one buffer stop element (55c) is able to be bent into the at least one buffer stop recess (56c);
        v. at least one buffer stop limit (58c) which is disposed in the at least one buffer stop recess (56c), defining the bending of the at least one buffer stop element (55c), wherein the at least one buffer stop element (55c) and the at least one stop element (45c, 46c) are one piece, and wherein the at least one stop element (45c, 46c) and the at least one flexibly pliable buffer stop element (55c) are one-piece with the tappet (15c).

* * * * *